US 6,629,901 B2

(12) United States Patent  
Huang

(10) Patent No.: US 6,629,901 B2  
(45) Date of Patent: Oct. 7, 2003

(54) COMPOSITE GRIP FOR GOLF CLUBS

(76) Inventor: Ben Huang, 19472 Woodlands La., Huntington Beach, CA (US) 92648

( * ) Notice: Subject to any disclaimer, the term of this patent is extended or adjusted under 35 U.S.C. 154(b) by 18 days.

(21) Appl. No.: 09/909,347

(22) Filed: Jul. 18, 2001

(65) Prior Publication Data

US 2002/0055392 A1 May 9, 2002

Related U.S. Application Data

(63) Continuation-in-part of application No. 09/709,684, filed on Nov. 9, 2000.

(51) Int. Cl.⁷ ............................................... A63B 49/08
(52) U.S. Cl. ...................................... 473/549; 473/302
(58) Field of Search ............................... 473/300, 301, 473/302, 303, 298; 428/327, 147, 423.9

(56) References Cited

U.S. PATENT DOCUMENTS

| 621,993 A | 3/1899 | Crosier |
| 1,017,565 A | 2/1912 | Lard |
| 1,665,791 A | 4/1928 | Novak |
| 2,941,806 A | 6/1960 | Stevens |
| 3,070,370 A | 12/1962 | Steiner |
| 3,252,706 A | 5/1966 | Rosasco, Sr. |
| 3,311,375 A | 3/1967 | Onions |
| 3,524,646 A | 8/1970 | Wheeler |
| 5,145,171 A | 9/1992 | Head et al. |
| 5,275,407 A | * 1/1994 | Soong .......................... 473/549 |
| 5,478,074 A | 12/1995 | Storper |
| 5,513,845 A | 5/1996 | Sonagere |
| 5,620,180 A | 4/1997 | Hong |
| 5,626,527 A | 5/1997 | Eberlein |
| 5,730,662 A | 3/1998 | Rens |
| 5,797,813 A | 8/1998 | Huang |
| 5,851,632 A | * 12/1998 | Chen et al. .................. 428/156 |
| 5,857,929 A | * 1/1999 | Huang .......................... 473/549 |
| 5,924,941 A | * 7/1999 | Hagey .......................... 473/551 |

* cited by examiner

Primary Examiner—Paul T. Sewell  
Assistant Examiner—Tom Duong  
(74) Attorney, Agent, or Firm—Fulwider Patton Lee & Utecht, L.L.P.

(57) ABSTRACT

A golf club grip made up of a composite strip that includes a first segment having a felt layer to the upper surface of which is bonded a polyurethane and a second segment having a felt layer to the upper surface of which is bonded a layer of polyurethane. Depressed decorative indicia are embossed on the upper surface area of the polyurethane layer of the second segment to densify such polyurethane layer. When the strip is spirally wrapped about a resilient underlisting sleeve or directly about the handle of a golf club the embossed indicia increases the hoop strength of the strip reducing the tendency of the strip to unravel.

9 Claims, 5 Drawing Sheets

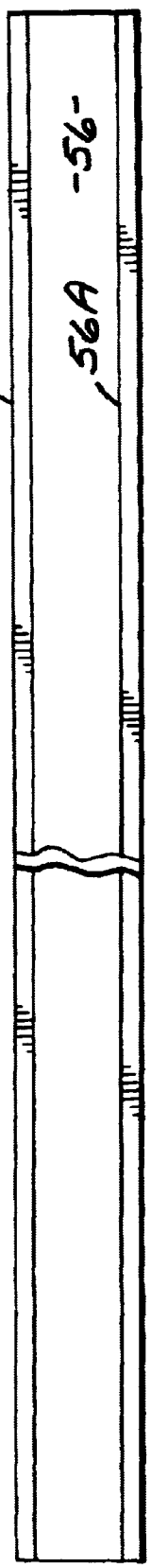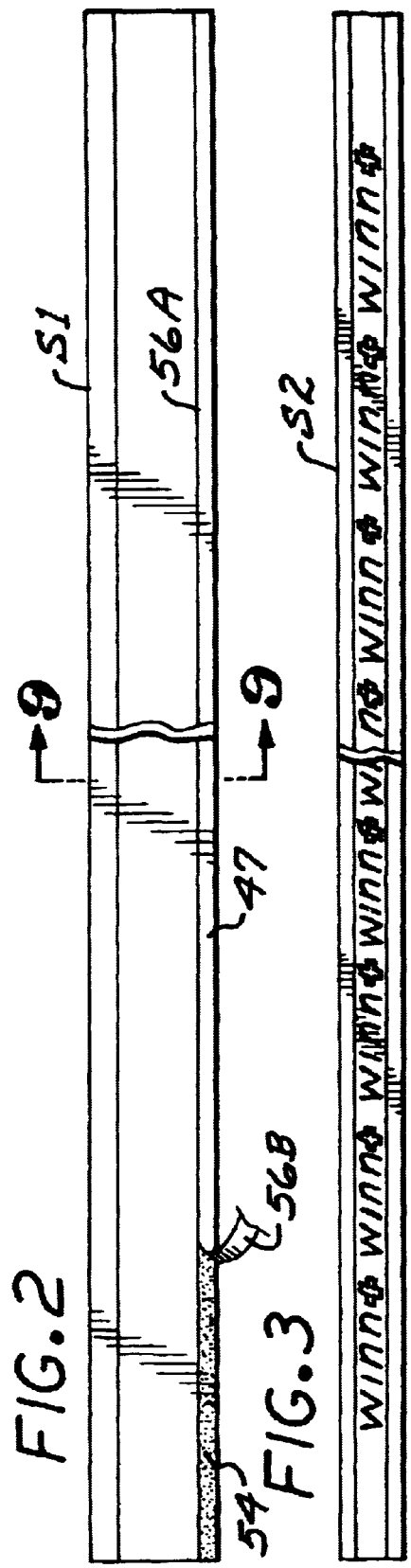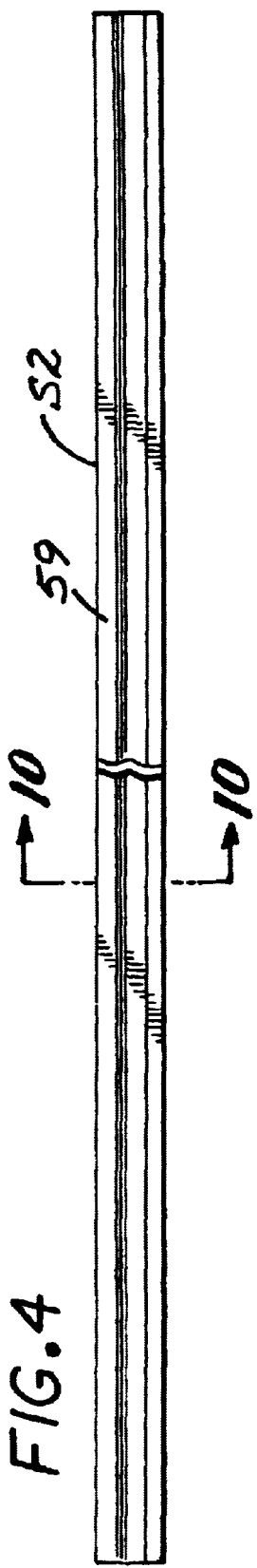

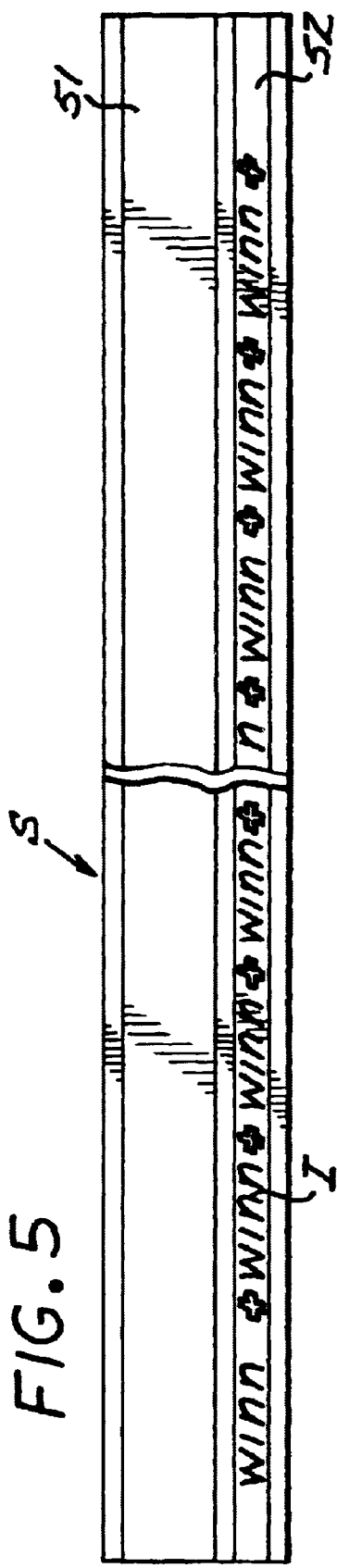

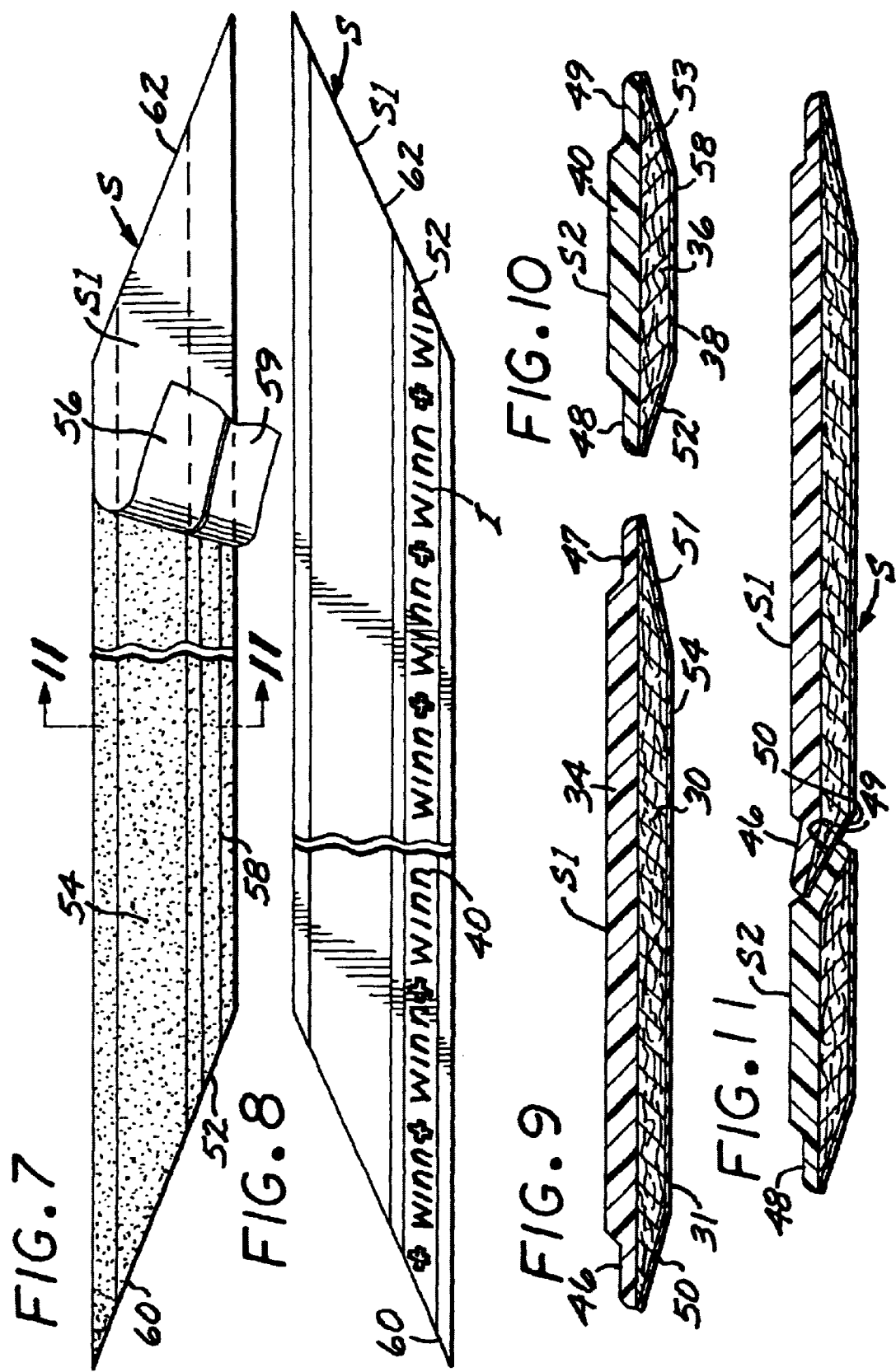

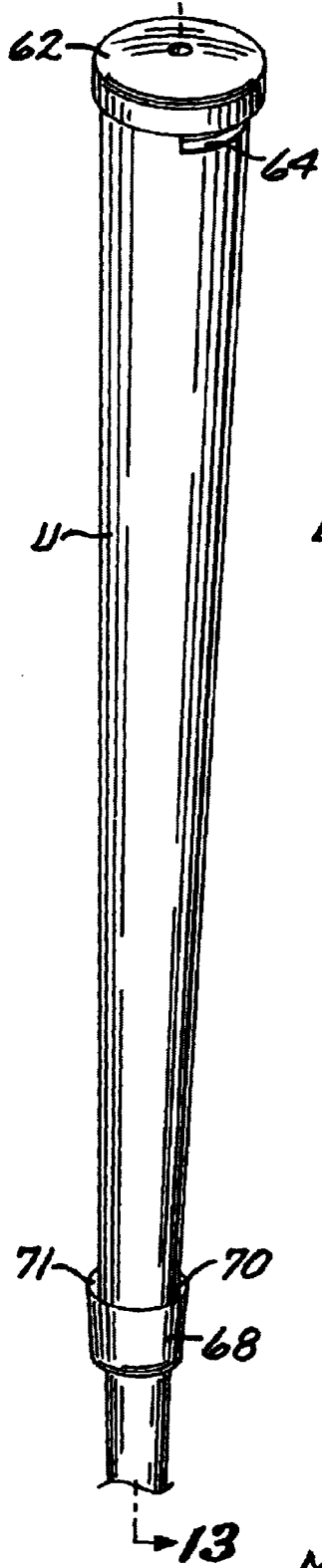
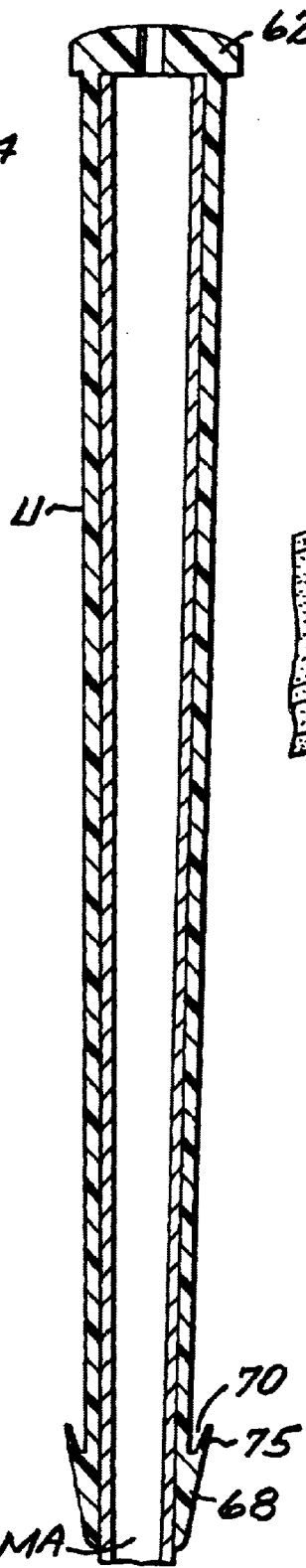
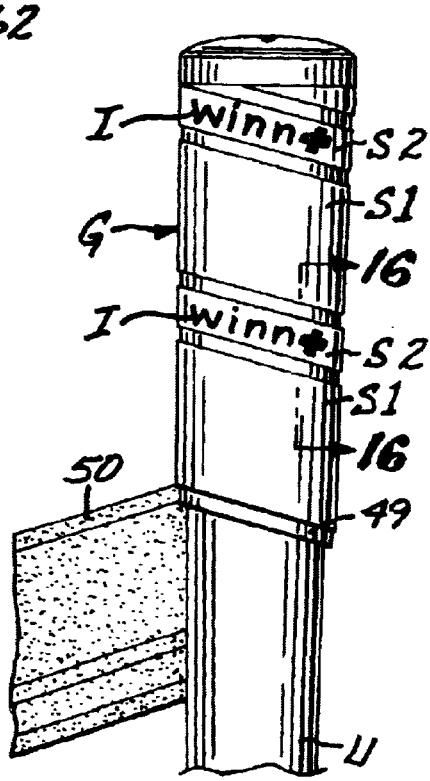
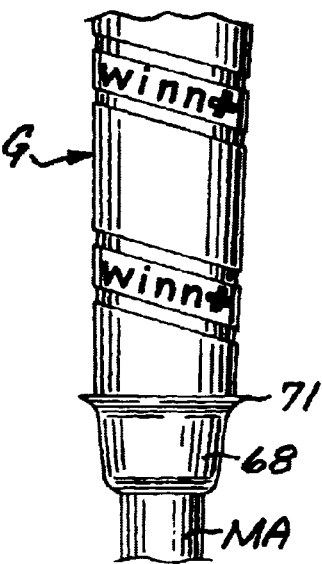

COMPOSITE GRIP FOR GOLF CLUBS

RELATED U.S. APPLICATION DATA

This application is a continuation in part of Ser. No. 09/709,684 filed by me Nov. 9, 2000.

BACKGROUND OF THE INVENTION

The present invention relates to an improved golf club grip.

Applicant has previously developed resilient grips which successfully reduce shock to the muscle and arm joints of the users of golf clubs, tennis racquets, racquet ball racquets, baseball bats and other impact imparting devices. See, for example, U.S. Pat. No. 5,797,813 granted to applicant Aug. 25, 1998. Such earlier grips utilize a polyurethane layer bonded to a felt layer to define a strip which is spirally wrapped around the handle of a golf club, racquet or the like to conform to the external configuration or such handle. In certain of such grips the sides of the felt layer taper from the side edges of the strip and the polyurethane layer is formed with recessed reinforcement side edges which overlap to form a water retarding joint between the side edges of the strip as the strip is wrapped around the handle or over a resilient sleeve telescopically carried by the handle. A problem common to polyurethane-felt golf club grips is the tendency of the side edges of the polyurethane-felt grips to unravel over a period of use from stretching of the strip as well as by frictional contact of the exterior of the strip with a golf bag as a golf club is removed from and returned into such golf bag.

SUMMARY OF THE INVENTION

Applicant has developed an improved shock resistant golf club grip utilizing a polyurethane-felt strip made up of two segments. Each segment is preferably of a different width. The narrower segment may be embossed with indicia so as to enhance the strength of such segment to thereby provide increased resistance against the edges of the segments being loosened from a golf club. The two segments may be of different colors so as to provide a golf club grip of a unique decorative appearance.

The two-piece strip of the present invention may be spirally wrapped about a tapered resilient underlisting sleeve, with such sleeve being slipped onto the handle of a golf club shaft. Alternatively, the strip may be directly spirally wrapped about the handle of a golf club tennis racquet or the like. When the two-piece strip is spirally wrapped about an underlisting sleeve, the sleeve may be positioned on a collapsible mandrel to provide a slip-on golf club grip that can be applied to a new golf club or can be utilized as a replacement golf club grip.

These and other features and advantages of the present invention will become apparent from the following detailed description of a preferred embodiment which, taken in conjunction with the accompanying drawings, illustrates by way of example the principles of the invention.

BRIEF DESCRIPTION OF THE DRAWINGS

FIG. 1 is a broken top plan view of a polyurethane-felt strip segment of a golf club grip embodying the present invention.

FIG. 2 is a broken bottom view of the segment of FIG. 1, showing a portion of a protective quick-release tape being peeled from the underside of such segment.

FIG. 3 is a broken top plan view of a narrower polyurethane-felt strip segment of a golf club grip embodying the present invention.

FIG. 4 is a broken bottom view of the segment of FIG. 3.

FIG. 5 is a broken top view of a composite strip fabricated from the two segments shown in FIGS. 1–4.

FIG. 6 is a broken bottom view of the strip of FIG. 5.

FIG. 7 is a broken bottom view of the strip of FIG. 5 after the strip has been cut to define starting and trailing ends.

FIG. 8 is a broken top view of the strip of FIG. 7.

FIG. 9 is a vertical sectional view taken in enlarged scale along line 9—9 of FIG. 2.

FIG. 10 is a vertical sectional view taken in enlarged scale along line 10—10 of FIG. 4.

FIG. 11 is a vertical sectional view taken in enlarged scale along line 11—11 of FIG. 7.

FIG. 12 is a perspective view of an underlisting sleeve which receives the composite strip shown in FIGS. 7–11 to define a golf club grip of the present invention.

FIG. 13 is a vertical sectional view taken along line 13—13 of FIG. 10.

FIG. 14 is a broken side elevational view showing a composite strip embodying the present invention being wrapped around the underlisting sleeve of FIGS. 12 and 13 to form a golf club grip embodying the present invention.

FIG. 15 is a broken side elevational view showing the lower end of the composite strip of FIG. 14 being secured to the lower portion of the underlisting sleeve.

FIG. 16 is a vertical sectional view taken in enlarged scale along line 16—16 of FIG. 14.

FIG. 17 is a horizontal sectional view taken in enlarged scale along line 17—17 of FIG. 16

FIG. 18 is an enlarged showing of the encircled area designated 18 in FIG. 16.

FIG. 19 is a perspective view showing a golf club grip embodying the present invention applied to the handle of a golf club.

DETAILED DESCRIPTION OF PREFERRED EMBODIMENT

Figures 16, 17, 18, 19:
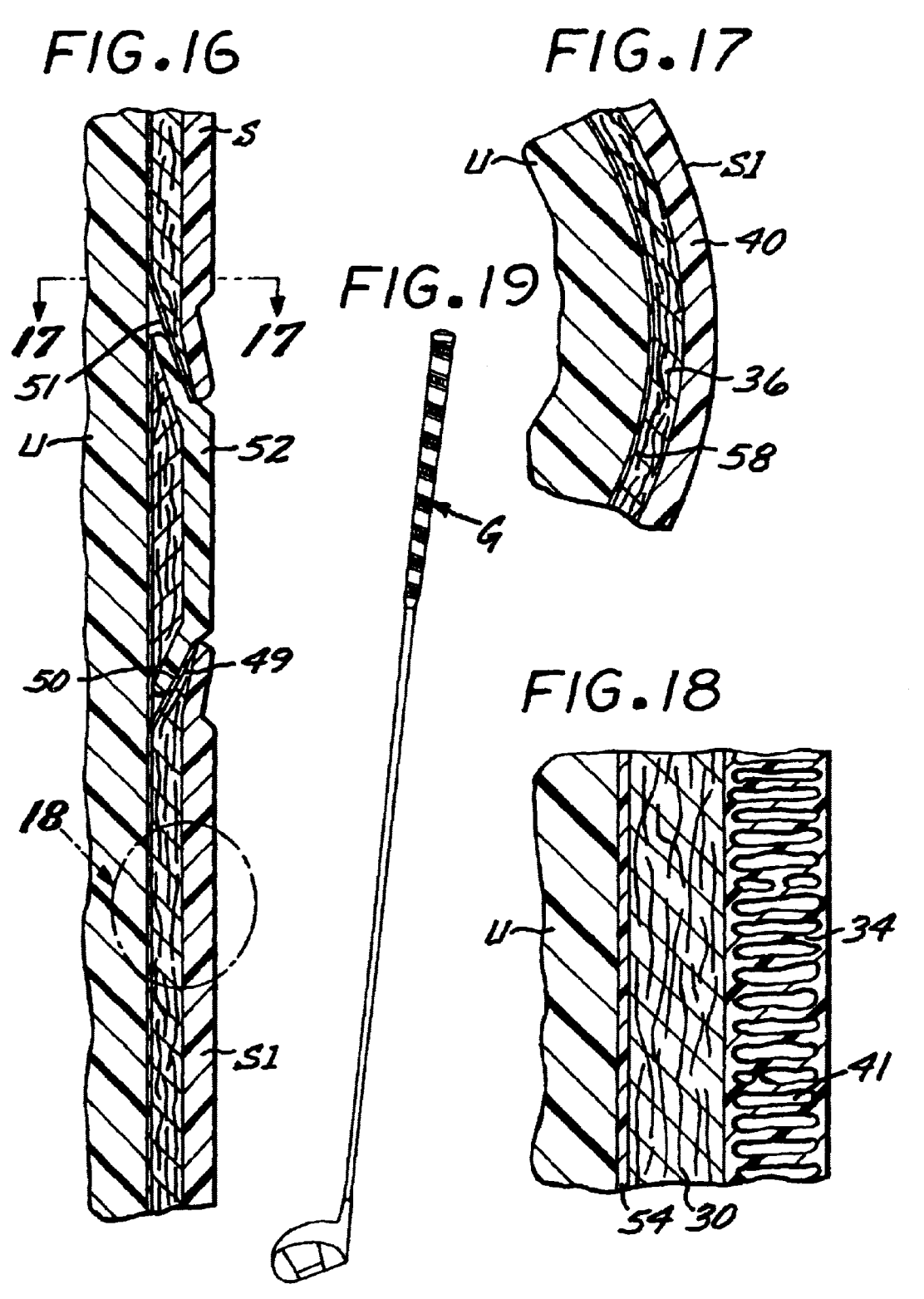

Referring to the drawings, a preferred form of grip G embodying the present invention utilizes an elongated composite two-piece strip S which is spirally wrapped around a resilient underlisting sleeve U which is slipped onto a golf club handle as shown in FIG. 19. Such strip may also be applied to the handle of other imparting devices (not shown) such as a tennis racquet.

More particularly, strip S is fabricated from first and second individual segments S1 and S2 of different widths, with segment S1 preferably being wider than segment S2. Segment S1 includes a bottom backing layer, generally designated 30 (preferably of felt) having an inner or bottom surface 31 which is adhered to an underlisting sleeve U shown in FIGS. 12–15. Segment S1 also includes a top layer of a suitable resilient plastic material, such as a smooth closed-pore polyurethane layer, generally designated 34, with the polyurethane layer being bonded to the upper surface of its adjacent bottom layer. The segment S1 may be formed with vertical air-passing perforations (not shown) such as described in my U.S. Pat. No. 5,645,501 issued Jul. 8, 1997. Segment S2 is similar in construction to segment S1 and includes an open-pored bottom backing layer, generally designated 36 (preferably of felt), having an inner or bottom surface 38 which is adhered to underlisting sleeve U. Segment S2 also includes a top layer 40 of a suitable resilient plastic material such as polyurethane layer, with the polyurethane layer being bonded to the upper surface of its adjacent backing layer 36. The polyurethane layer of each strip segment S1 and S2 may be formed in a conventional manner by coating a felt strip with one or more solutions of polyurethane (e.g., polyester or polyether) dissolved in a dimethyl formamide (DMF), immersing the coated strip in water baths to displace the DMF and cause the urethane to coagulate, and finally driving off the water by the application of pressure and heat. In this manner, pores 41 are formed (FIG. 18), while the underside of the polyurethane layer is bonded to the upper surface of the felt layer. The thickness of the polyurethane layer is preferably about 0.2–1.40 millimeters and the thickness of the felt layer is about 0.7–1.90 millimeters.

The felt layers 30 and 36 serve as backing layers for the polyurethane layer 34 and polyurethane coating 40 so as to provide strength for the polyurethane. The felt also cooperates with the polyurethane to assist in cushioning the shocks applied to a grip when a golf ball is struck by a golf club. It should be noted that other materials may be substituted for the felt as a backing layer to provide strength for the polyurethane and to cushion shocks, e.g., a synthetic plastic such as an ethylene-vinyl acetate copolymer, commonly known as EVA. The felt may be fabricated of conventional suitable materials such as nylon, cotton, polyester or the like.

Referring now to FIGS. 7 and 9, the entire underside of backing layer 30 of segment S1 is provided with an adhesive 54 initially covered in a conventional manner by a peel-away tape 56. Peel-away tape 56 includes a score line 56A over skived edge 50 which defines a thin band 56B which can be pulled off the main body of tape 56 to expose adhesive 54 disposed on one edge of segment S1, while the tapes' main body remains on the adhesive covering the remainder of the segment S1.

Referring now to FIG. 9, the side edges of the polyurethane layer 34 of segment S1 are formed with sidewardly and outwardly extending reinforcement side edges 46 and 47. As shown in FIG. 10, the side edges of the polyurethane layer 40 of segment S2 are also formed with sidewardly and outwardly extending reinforcement side edges 48 and 49. In FIG. 9, the side edges of the felt layer 34 of segment S1 have been skived to form outwardly and upwardly slanted side edges 50 and 51. Similarly, as shown in FIG. 10, the side edges of felt layer of segment S2 have been skived to form outwardly and upwardly slanted side edges 52 and 53. The underside of segment S2 is covered with an adhesive 58 initially covered by a peel-away tape 59 (FIG. 4). To combine segments S1 and S2 into composite strip S, the band 56B of peel-away tape 56 is pulled off segment S1 as shown in FIG. 2. A skived side edge 50 of segment S1 is then placed on top of reinforced side edge 49 of segment, S2 as shown in FIG. 11 and pressed onto segment S2. The strip S is then cut on both ends to provide the leading edge and trailing edges 60 and 62, as shown in FIGS. 7 and 8.

It should be particularly noted that the upper area of polyurethane layer 40 of segment S2 inwardly of the recessed side edges is embossed with depressed indicia I, such as the name of the manufacturer of the golf club grip. Such embossing serves not only as a decorative enhancement of the golf club grip, but additionally, the embossing process densifies the polyurethane layer 40 so as to reduce stretching of the second segment and thereby increase the hoop strength of the strip S. It is also desirable to mold the polyurethane layer 34 of segment S1 in a first color while polyurethane layer 40 of segment S2 is molded in a second color that contrasts with the first color. With this arrangement, a multicolored grip having a pleasing appearance will result when the strip S is spirally wrapped about an underlisting sleeve.

Referring now to FIGS. 12 and 13, there is shown a resilient rubber-like underlisting sleeve U which can be utilized in forming a slip-on grip of the present invention. Underlisting sleeve U is fabricated of synthetic plastic foam or rubber utilizing a perforated integral cap 62. Below the cap 62 there is formed a groove 64 to receive the upper tip of the starting tongue 60 of the strip S. The lower end of the sleeve is formed with an integral nipple 68. The upper portion of nipple 68 is provided with an upwardly-facing circumferential groove 70 defined by a circumferential lip 71. Underlisting sleeve U is similar to that described in my U.S. Pat. No. 6,386,989.

Strip S may be spirally wound about underlisting sleeve U by peeling tapes 56 and 59 off the underside of segments S1 and S2 to expose adhesives 54 and 58. Strip S is then spirally wound around the underlisting sleeve U starting with the upper end of the sleeve, the tip of the strip starting edge tongue 60 being first inserted in the groove 64 of the sleeve whereafter the strip is wrapped about one and one half times around the upper or butt end of the sleeve to provide a smooth configuration of the strip on the sleeve as shown in FIG. 14. With continued reference to FIG. 14 and additionally to FIGS. 15 and 16, as the strip S is wrapped around the underlisting sleeve U the underside of the skived side edges 50 and 51 of segment S1 overlap the recessed side edges 49 and 48 of segment S2, such edges being secured together in a watertight manner by adhesives 54 and 58. With this arrangement, skived slanted side edges of segment S1 cover the recessed side edges of segment S2 so that the fingers of a golfer pressing on segment S1 force the strip S firmly against the underlisting sleeve to inhibit unraveling of the strip from the underlisting. The use of slanted side edges 50 and 51 having different widths permits a more pleasing longitudinal profile of the completed grip G while the narrower slanted edge 51 reduces the amount of felt cut off the felt the layer thereby maintaining the strength of the completed strips. It should be understood that the underlisting sleeve may be supported upon a conventional collapsible mandrel MA as the strip S is wrapped therearound.

When the lower edge of the strip S has been spirally wound to a position on underlisting sleeve wherein its lower edge is disposed in approximate horizontal alignment with the lower portion of nipple groove 70, the lower end portion of the strip is manually urged into the confines of the groove by temporarily expanding the peripheral lip 71 formed outwardly of the groove so as to admit the lower edge of the strip into the groove. When the lip snaps back to its original position, such lip will securely retain the lower end of the strip within the nipple. The completed sleeve and strip combination may then be removed from the mandrel MA. Such sleeve and strip combination will define a preferred form of slip-resistant slip-on golf club grip embodying the present invention.

It should be noted that the tight fit between the nipple lip 71 and the lower portion of the composite strip S enhances the resistance to unraveling of the side edges of the strip provided by the increased hoop strength obtained by embossing the upper surface of strip segment S2. Accordingly, a grip embodying the present invention will resist unraveling over an extended period of use by a golfer.

Various modifications can be made without departing from the spirit and scope of the present invention. By way of example, the golf club grip may be formed of a composite strip of more than two segments. Also, the segments may be of equal width. Accordingly, it is not intended that the invention be limited, except by the appended claims.

What is claimed is:

1. A resilient grip for a golf club handle wherein the resilient grip comprises:
   a strip having a first segment that includes a layer of felt to the upper surface of which is bonded a layer of polyurethane;
   a second segment having a layer of felt to the upper surface of which is bonded a coating of polyurethane and with depressed decorative indicia being embossed on the upper area of such second segment to densify the polyurethane layer thereof and thereby reduce stretching of such second segment;
   with a side of one segment being attached adhesively along its side edge to a side edge of the other segment to define said strip;
   heat compressed radially inwardly extending reinforcement side edges formed in the polyurethane layer of the first and second segments along the length of the segments;
   a resilient underlisting sleeve;
   slanted side edges formed along the length of the felt-layer of the segments, with the strip being spirally wrapped about the sleeve to define said grip, the underside of the adjoining recessed side edges being overlapped by the slanted side edges to define a water retarding joint between the adjoining side edges; and
   the sleeve being positioned upon the golf club handle with the depressed decorative indicia increasing the hoop strength of the grip relative to the sleeve.

2. A resilient grip as set forth in claim 1 wherein the first segment is wider than the second segment.

3. A resilient grip as set forth in claim 1 wherein the segments are of different colors.

4. A resilient grip as set forth in claim 1 wherein the first segment is wider than the second segment and the segments are of different colors.

5. A resilient grip as set forth in claim 1 wherein the adhesive of the backing layer of the first segment is initially covered by peel-off tape that is scored along one side to define a band that covers a skived side edge of said backing layer, said band being removed for attachment to a recessed reinforcement side edge of the second segment.

6. A resilient grip as set forth in claim 1 wherein the bottom of the underlisting sleeve includes a nipple formed with a groove having a peripheral lip; and
   the lower edge of the strip is positioned with a tight fit within the groove as the strip is spirally wrapped about the underlisting sleeve, with such tight fit enhancing resistance to unraveling of the strip from the sleeve obtained by densifying the depressed decorative indicia.

7. A resilient grip as set forth in claim 6 wherein the first segment is wider than the second segment.

8. A resilient grip as set forth in claim 7 wherein the segments are of different colors.

9. A resilient grip as set forth in claim 8 wherein the adhesive of the backing layer of the first segment is initially covered by peel-off tape that is scored along one side to define a band that covers a skived side edge of said backing layer, said band being removed for attachment to a recessed reinforcement side edge of the second segment.

* * * * *